United States Patent
Sawa et al.

(10) Patent No.: US 12,024,757 B2
(45) Date of Patent: Jul. 2, 2024

(54) HYDROGEN STORAGE ALLOY FOR ALKALINE STORAGE BATTERY AND ALKALINE STORAGE BATTERY USING THE SAME

(71) Applicants: JAPAN METALS AND CHEMICALS CO., LTD., Tokyo (JP); TOYOTA JIDOSHA KABUSHIKI KAISHA, Toyota (JP)

(72) Inventors: Takao Sawa, Nishiokitama-gun (JP); Saki Notoyama, Nishiokitama-gun (JP); Naoyoshi Terashita, Nishiokitama-gun (JP); Katsuyuki Kudo, Nishiokitama-gun (JP); Makio Kon, Toyota (JP); Masashi Kodama, Toyota (JP); Hiroshi Nishiyama, Toyota (JP)

(73) Assignees: JAPAN METALS AND CHEMICALS CO., LTD., Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 557 days.

(21) Appl. No.: 17/290,364

(22) PCT Filed: Oct. 1, 2019

(86) PCT No.: PCT/JP2019/038720
§ 371 (c)(1),
(2) Date: Apr. 30, 2021

(87) PCT Pub. No.: WO2020/100456
PCT Pub. Date: May 22, 2020

(65) Prior Publication Data
US 2021/0408535 A1  Dec. 30, 2021

(30) Foreign Application Priority Data
Nov. 15, 2018 (JP) .................................. 2018-214848

(51) Int. Cl.
*C22C 19/00* (2006.01)
*B22F 1/05* (2022.01)
(Continued)

(52) U.S. Cl.
CPC ................ *C22C 19/00* (2013.01); *B22F 1/05* (2022.01); *H01M 4/242* (2013.01); *H01M 4/383* (2013.01);
(Continued)

(58) Field of Classification Search
CPC ................ H01M 4/242; H01M 4/383; H01M 2004/021; H01M 2004/027; H01M 10/24;
(Continued)

(56) References Cited

U.S. PATENT DOCUMENTS

2003/0096164 A1  5/2003  Sakai et al.
2009/0087745 A1  4/2009  Ako et al.
(Continued)

FOREIGN PATENT DOCUMENTS

JP  H11-323469 A  11/1999
JP  2000-182608  *  6/2000
(Continued)

OTHER PUBLICATIONS

English translation of JP Publication 2015-028845, Feb. 2015.*
(Continued)

*Primary Examiner* — Brittany L Raymond
(74) *Attorney, Agent, or Firm* — Oliff PLC

(57) ABSTRACT

A hydrogen storage alloy suitable for a negative electrode of an on-board alkaline storage battery, and an alkaline storage battery using the alloy, which has an $AB_3$-type crystal structure as a main phase, represented by: $(Sm_xLa_yR_z)_{1-a-b}Mg_aT_bNi_cCo_dMe$. (R is selected from Pr, Nd; T is selected from Ti, Zr, Hf; M is selected from V, Nb, Ta, Cr, Mo, W, Mn, Fe, Cu, Al, Si, P, B; the following conditions are met:
(Continued)

$0<x<1.0$, $0<y<1.0$, $0.8 \leq x+y \leq 1.0$, $x+y+z=1.0$; $0.93 \leq (x-y) \cdot (1-a-b)+4.5(a+b) \leq 1.62$, $0<a \leq 0.45$, $0 \leq b \leq 0.05$, $0 \leq d \leq 0.7$, $0 \leq e \leq 0.15$, $2.85 \leq c+d+e \leq 3.15$ and $0.01 \leq d+e$).

16 Claims, 2 Drawing Sheets

(51) Int. Cl.
  *H01M 4/24* (2006.01)
  *H01M 4/38* (2006.01)
  *H01M 4/48* (2010.01)
  *H01M 10/24* (2006.01)
  *H01M 10/36* (2010.01)
  *H01M 4/02* (2006.01)

(52) U.S. Cl.
  CPC ............ *H01M 4/48* (2013.01); *H01M 10/24* (2013.01); *H01M 10/36* (2013.01); *H01M 2004/021* (2013.01); *H01M 2004/027* (2013.01); *H01M 2004/028* (2013.01); *H01M 2220/20* (2013.01); *H01M 2300/0014* (2013.01)

(58) Field of Classification Search
  CPC ........... H01M 10/26; H01M 2300/0014; C01P 2004/61
  See application file for complete search history.

(56) References Cited

U.S. PATENT DOCUMENTS

| 2010/0216018 A1 | 8/2010 | Yasuoka et al. |
| 2015/0010812 A1 | 1/2015 | Ohyama et al. |

FOREIGN PATENT DOCUMENTS

| JP | 2000-182608 A | | 6/2000 |
| JP | 2005-32573 A | | 2/2005 |
| JP | 2009-87631 A | | 4/2009 |
| JP | 2010-225577 A | | 10/2010 |
| JP | 2010-231940 | * | 10/2010 |
| JP | 2010-231940 A | | 10/2010 |
| JP | 2015-028845 | * | 2/2015 |
| WO | 01/48841 A1 | | 7/2001 |
| WO | 2014/118846 A1 | | 8/2014 |

OTHER PUBLICATIONS

Dec. 24, 2019 International Search Report issued in International Patent Application No. PCT/JP2019/038720.
Dec. 18, 2019 Office Action issued in Japanese Patent Application No. 2018-214848.

* cited by examiner

HYDROGEN STORAGE ALLOY FOR ALKALINE STORAGE BATTERY AND ALKALINE STORAGE BATTERY USING THE SAME

TECHNICAL FIELD

The present invention relates to a hydrogen storage alloy that is used for an on-board alkaline storage battery in which an electrode group including a nickel positive electrode, a hydrogen storage alloy negative electrode, and a separator is housed inside an exterior can along with an alkaline electrolytic solution, and to an alkaline storage battery that is suitably used as a power source for a hybrid electric vehicle (HEV), an automobile having a start-stop function, and the like.

BACKGROUND ART

Recently, secondary batteries have been widely used in, for example, mobile phones, personal computers, electric tools, hybrid electric vehicles (HEVs), and pure electric vehicles (PEVs), and alkaline storage batteries are mainly used for these purposes. For those alkaline storage batteries that are used for vehicle-related purposes, such as hybrid electric vehicles (HEVs), plug-in hybrid electric vehicles (PHEVs), and pure electric vehicles (PEVs), high-output capability and high durability are particularly important. As the use of alkaline storage batteries for these purposes is becoming increasingly widespread, making them smaller and lighter is ever more desired.

Hydrogen storage alloys with an $AB_5$-type crystal structure have been conventionally used for negative electrodes of alkaline storage batteries. However, as downsizing and weight reduction of batteries achieved by these alloys are limited, development of a new hydrogen storage alloy that can realize a small, high-capacity battery has been anticipated. As solutions, Patent Literature 1 and Patent Literature 2 propose rare earth-Mg-transition metal-based hydrogen storage alloys including Mg.

One example of possible approaches to downsizing and weight reduction is to reduce the amount of a hydrogen storage alloy used for the negative electrode. However, reducing the amount of a hydrogen storage alloy raises a new problem that the output decreases due to a decrease in the number of nickel active sites. To solve this problem, Patent Literature 3 proposes a technique of raising an operating voltage by using a hydrogen storage alloy having a high hydrogen equilibrium pressure.

Further, Patent Literature 4 discloses a battery that uses a hydrogen storage alloy. This alloy has a crystal structure of an $A_5B_{19}$-type structure, of which a stoichiometric ratio (B/A) that is a molar ratio of component B to component A is 3.8 or higher. A capacity ratio Z (=Y/X) that is a ratio of a capacity Y of a hydrogen storage alloy negative electrode to a capacity X of a nickel positive electrode of the battery is 1.2 or lower (1.0<Z≤1.2). According to this literature, this battery can achieve a balance between low-temperature output and durability when used so as to be partially charged or discharged.

Meanwhile, as measures to suppress a decrease in the capacity of an alkaline secondary battery as the number of charge-discharge cycles increases, Patent Literature 5 discloses a technology of using a rare earth-Mg—Ni-based hydrogen storage alloy for an alkaline secondary battery. This alloy has a $PuNi_3$-type or $CeNi_3$-type crystal structure and has an element composition represented by a general formula: $(A_\alpha M_{1-\alpha})_{1-\beta} Mg_\beta Ni_\gamma T_\delta$. (In this formula, A is at least one element selected from the group consisting of Sm and Gd; M is at least one element selected from the group consisting of La, Ce, Pr, Nd, Pm, Eu, Tb, Dy, Ho, Er, Tm, Yb, Lu, Ca, Sr, Sc, Y, Ti, Zr, and Hf; T is at least one element selected from the group consisting of V, Nb, Ta, Cr, Mo, Mn, Fe, Co, Zn, Al, Ga, Sn, In, Cu, Si, P, and B; and suffixes α, β, γ, and δ represent numbers respectively meeting the conditions: 0.4≤α, 0.05<β<0.22, 0.04≤δ≤1.00, 2.7≤γ+δ≤3.30).

Further, Patent Literature 6 discloses a technology involving a hydrogen storage alloy represented by a general formula: $Ln_{1-x}Mg_xNi_{y-a-b}Al_aM_b$. (In the formula, Ln is at least one element selected from rare earth elements including Zr, Ti, and Y; M is at least one element selected from V, Nb, Ta, Cr, Mo, Mn, Fe, Co, Ga, Zn, Sn, In, Cu, Si, P, B, and Zr; and the following conditions are met: 0.05≤x≤0.35, 0.05≤a≤0.30, 0≤b≤0.5, and 2.5≤y<3.3). This alloy is used as a hydrogen storage alloy for a negative electrode of an alkaline storage battery that, even when repeatedly charged and discharged, undergoes less oxidation of the hydrogen storage alloy and can maintain a high capacity for a long period of time.

Further, Patent Literature 7 reports a hydrogen storage alloy electrode for which hydrogen storage alloy particles of which the median size D50 represented by a passing rate 50% is within a range of 8 to 15 μm is used to achieve high-rate discharge.

CITATION LIST

Patent Literature

Patent Literature 1: JP-A-H11-323469
Patent Literature 2: International Publication No. WO 01/48841
Patent Literature 3: JP-A-2005-32573
Patent Literature 4: JP-A-2009-87631
Patent Literature 5: JP-A-2010-231940
Patent Literature 6: JP-A-2010-225577
Patent Literature 7: JP-A-2000-182608

SUMMARY OF INVENTION

Technical Problem

However, the alloys in the technologies disclosed in Patent Literature 1 and Patent Literature 2 described above are not optimized enough for the batteries to be installed in hybrid electric vehicles.

The technology disclosed in Patent Literature 3 faces a new problem that using a hydrogen storage alloy having a high hydrogen equilibrium pressure shortens the charge-discharge cycle life.

In the technology disclosed in Patent Literature 4, to be made even more smaller and lighter, the battery needs to have high output, i.e., high energy density, which in turn requires the battery to be sized with the value of a maximum dischargeable current per battery capacity (limit current value) taken into account. This is because simply downsizing the battery, i.e., simply reducing its size only reduces the battery capacity. However, this is not taken into consideration in the technology of Patent Literature 4.

The alkaline storage batteries using the hydrogen storage alloys disclosed in Patent Literature 5 and Patent Literature 6 fail to achieve a balance between the high-rate discharge characteristic and the cycle life characteristic, which makes them inadequate as on-board alkaline storage batteries.

The hydrogen storage alloy used in Patent Literature 7 is a so-called $AB_5$ alloy ($MmNi_{4.0}Co_{0.4}Mn_{0.3}Al_{0.3}$) and needs further characteristics improvement in terms of durability etc. to be used on board a vehicle.

Having been made in view of the problems with these existing technologies, the present invention aims to provide a hydrogen storage alloy that is suitable particularly for an on-board nickel hydrogen battery (alkaline storage battery), and an alkaline storage battery using this alloy.

Solution to Problem

An alkaline storage battery that is the subject of the present invention is a storage battery in which an electrode group including a nickel positive electrode, a hydrogen storage alloy negative electrode, and a separator is housed inside an exterior can along with an alkaline electrolytic solution. When an alloy of which a main phase has a crystal structure of an $AB_3$-type structure and which has a specific element composition is used as a hydrogen storage alloy for a negative electrode to achieve the above object, a good balance can be achieved among the three characteristics, namely, the discharge capacity characteristic, the charge-discharge cycle life characteristic, and the high-rate discharge characteristic. Moreover, the battery has also a partial charge-discharge control characteristic that is favorable particularly as an on-board battery. These findings have led to the development of the present invention.

First, the present invention provides a hydrogen storage alloy for an alkaline storage battery that is characterized in that a main phase of the hydrogen storage alloy has a crystal structure of an $AB_3$-type structure, particularly a $PuNi_3$ type or a $CeNi_3$ type, and that the hydrogen storage alloy has an element composition represented by the following general formula (1):

$$(Sm_xLa_yR_z)_{1-a-b}Mg_aT_bNiCo_dM_e \quad (1).$$

Here, R, T, and M in this formula (1) are as follows:
R is one or two selected from Pr and Nd;
T is one or two or more selected from Ti, Zr, and Hf; and
M is one or two or more selected from V, Nb, Ta, Cr, Mo, W, Mn, Fe, Cu, Al, Si, P, and B.

Suffixes x, y, z, a, b, c, d, and e meet the following conditions:

$$0<x<<1.0, 0<y<1.0, 0.8 \le x+y \le 1.0, x+y+z=1.0;$$

$$0.93 \le (x-y) \cdot (1-a-b) + 4.5(a+b) \le 1.62;$$

$$0<a \le 0.45;$$

$$0 \le b \le 0.05;$$

$$0 \le d \le 0.7;$$

$$0 \le e \le 0.15;$$

$$2.85 \le c+d+e \le 3.15; and$$

$$0.01 \le d+e.$$

It is preferable that the hydrogen storage alloy according to the present invention have a particle size D50 on a basis of mass of 3 to 20 μm and a particle size D90 on a basis of mass of 8 to 50 μm. Further, it is preferable that the hydrogen storage alloy have an alkali-treated layer or an acid-treated layer on a surface.

Secondly, the present invention provides an alkaline storage battery that uses the above-described hydrogen storage alloy as a negative electrode. This alkaline storage battery is characterized in that it is installed in a hybrid electric vehicle having a motor as a driving source and supplies electricity to the motor, or that it is installed in an automobile that has a start-stop function with an engine started by a starter motor and supplies electricity to the starter motor.

It is preferable that the state of charge during use of the alkaline storage battery according to the present invention be within a range of 20 to 80%.

Advantageous Effects of Invention

The hydrogen storage alloy for an alkaline storage battery, and the alkaline storage battery that uses this hydrogen storage alloy, of the present invention are excellent in discharge capacity characteristic and high-rate discharge characteristic and capable of sufficiently high high-rate discharge also under on-board service conditions, and therefore have a high output density and an excellent charge-discharge cycle life. Thus, the present invention can make alkaline storage batteries smaller and lighter. When such batteries are installed in automobiles, hybrid electric vehicles (HEVs) etc. that have high motion performance and good fuel economy become available.

DESCRIPTION OF EMBODIMENTS

Figure 1:
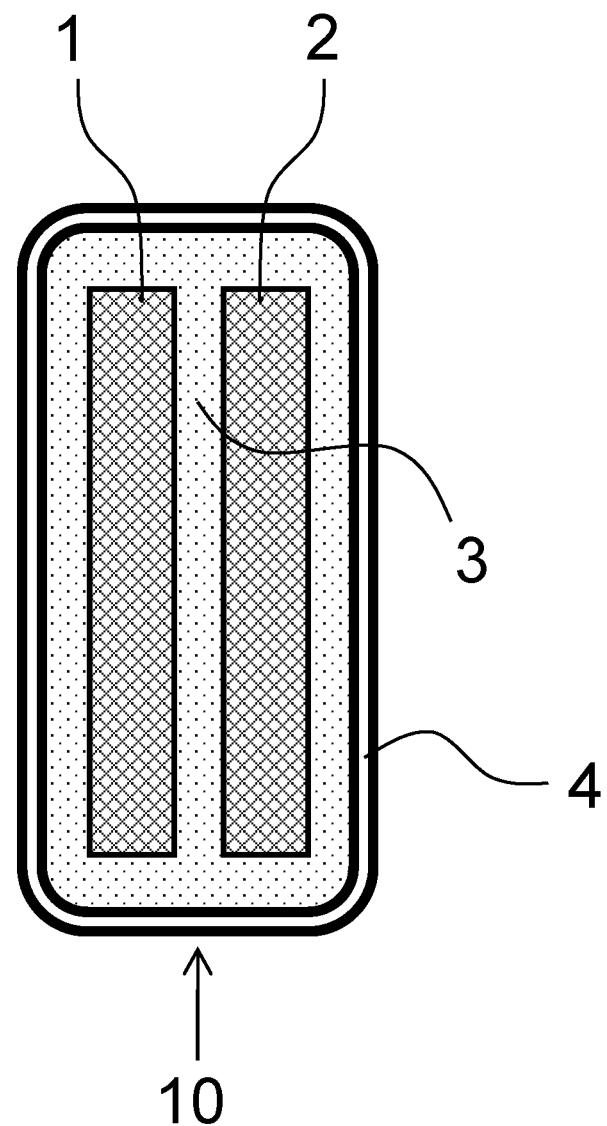
FIG. 1 is a schematic sectional view illustrating an alkaline storage battery of one embodiment of the present invention.

An alkaline storage battery of the present invention will be described based on FIG. 1 that is a schematic sectional view illustrating a battery of one embodiment of the present invention. The alkaline storage battery to which the present invention is applied is an alkaline storage battery 10 in which an electrode group including a nickel positive electrode 1 having nickel hydroxide ($Ni(OH)_2$) as a main positive-electrode active material, a hydrogen storage alloy negative electrode 2 having a hydrogen storage alloy (MH) as a negative-electrode active material, and a separator (not shown) is housed inside an exterior can 4 along with an electrolyte layer 3 filled with an alkaline electrolytic solution.

This battery 10 is classified as a so-called nickel-metal hydride battery (Ni-MH battery), in which the following reactions occur:

$NiOOH + H_2O + e^- = Ni(OH)_2 + OH^-$     Positive electrode:

$MH + OH^- = M + H_2O + e^-$     Negative electrode:

[Hydrogen Storage Alloy]

In the following, a first embodiment of the present invention, a hydrogen storage alloy used for an on-board alkaline storage battery, will be described.

To be applied as a negative electrode of an on-board alkaline storage battery, the hydrogen storage alloy of the present invention needs to have a main phase with a crystal structure of an $AB_3$-type structure, specifically $PuNi_3$ type or $CeNi_3$ type, and have an element composition represented by the following general formula (1):

$$(Sm_xLa_yR_z)_{1-a-b}Mg_aT_bNi_cCo_dM_e \quad (1).$$

Here, R, T, and M in the formula (1) are as follows:
R is one or two selected from Pr and Nd;
T is one or two or more selected from Ti, Zr, and Hf;
M is one or two or more selected from V, Nb, Ta, Cr, Mo, W, Mn, Fe, Cu, Al, Si, P, and B.
Suffixes x, y, z, a, b, c, d, and e meet the following conditions:

$$0<x<1.0, 0<y<1.0, 0.8 \leq x+y \leq 1.0, x+y+z=1.0;$$

$$0.93 \leq (x-y) \cdot (1-a-b) + 4.5(a+b) \leq 1.62;$$

$$0<a \leq 0.45;$$

$$0 \leq b \leq 0.05;$$

$$0 \leq d \leq 0.7;$$

$$0 \leq e \leq 0.15;$$

$$2.85 \leq c+d+e \leq 3.15; \text{and}$$

$$0.01 \leq d+e.$$

When used as a negative electrode of an alkaline storage battery, the alloy represented by this general formula (1) imparts a high discharge capacity and excellent high-rate discharge characteristic and cycle life characteristic to the battery, and as a result, contributes to downsizing and weight reduction as well as durability enhancement of the alkaline storage battery.

Reasons for limiting the element composition of the hydrogen storage alloy of the present invention will be described below.

Rare earth elements: $Sm_xLa_yR_z$ (where $0<x<1.0$, $0<y<1.0$, $0.8 \leq x+y \leq 1.0$, $x+y+z=1.0$)

The hydrogen storage alloy of the present invention contains rare earth elements as the elements of component A of the $AB_3$-type structure. As the rare earth elements, both Sm and La are essential, and as element R, one or two elements selected from Pr and Nd are contained. When the atomic ratios of Sm and La in the rare earth elements are x and y, respectively, the sum of x and y needs to meet the condition $0.8 \leq x+y \leq 1.0$. When x+y is 0.8 or higher, a balance can be achieved between the durability and the cost of the alkaline storage battery. When the high-rate discharge characteristic is taken into account, up to 0.1 of the atomic ratio of each of Pr and Nd in the rare earth elements can be substituted. While Ce that is one of rare earth elements is not actively used, it may be contained at a level of inevitable impurities.

Mg: $Mg_a$ (where $0<a \leq 0.45$)

Mg is an essential element in the present invention that constitutes part of component A of the $AB_3$-type structure, and contributes to increasing the discharge capacity and securing excellent high-rate discharge characteristic and cycle life characteristic. If Mg is not added, the hydrogen releasing performance deteriorates and the discharge capacity decreases. In the present invention, therefore, the value a representing the atomic ratio of Mg should be larger than zero. The value a is preferably 0.01 or larger. On the other hand, when the value a exceeds 0.45, the $AB_3$-type structure becomes difficult to maintain, as well as the discharge capacity decreases and the high-rate discharge characteristic deteriorates, and so does the cycle life characteristic. Therefore, the value a of the atomic ratio of Mg should be larger than zero but not larger than 0.45.

As will be described later, since Mg has a high vapor pressure, manufacturing of an alloy containing a large amount of Mg requires caution to be exercised particularly in a dissolving process and a heat treatment process. However, when the value a is 0.11 or smaller, smelting and heat-treating the alloy is relatively possible and the raw material cost is lower; therefore, the value a is preferably 0.11 or smaller. The value a is more preferably within a range of 0.01 to 0.09. On the other hand, the higher the content of Mg is, the higher the battery characteristics obtained will be. Therefore, when higher battery characteristics are desired, the value a is preferably within a range of 0.17 to 0.45, and further within a range of 0.18 to 0.40.

Another Element of Component A: $T_b$ (where $0 \leq b \leq 0.05$)

Another element T constituting part of component A of the $AB_3$-type structure is one or two or more elements selected from Ti, Zr, and Hf, and these elements can be added as they contribute to improving the cycle characteristic. However, when the value b that is the total atomic ratios of these elements exceeds 0.05, the discharge capacity may decrease. Therefore, the upper limit should be 0.05. The value b is preferably 0.04 or smaller.

Ni: $Ni_c$

Ni is a main element of component B of the $AB_3$-type structure. The atomic ratio of this element will be described later.

Co: $Co_d$ (where $0 \leq d \leq 0.7$)

Co is contained as an element of component B of the $AB_3$-type structure, and this element is effective in increasing the capacity of the battery. To reliably produce this effect, the value d representing the atomic ratio of Co is preferably 0.01 or larger. However, when the value d exceeds 0.7, this effect weakens gradually while the cost increases. Therefore, the upper limit of the value d should be 0.7. From the viewpoint of the discharge capacity and the cost, the value d is more preferably within a range of 0.01 to 0.6, and further within a range of 0.02 to 0.5.

Another Element of Component B: $M_e$ (where $0 \leq e \leq 0.15$)

Another M element constituting part of component B of the $AB_3$-type structure is one or two or more elements selected from V, Nb, Ta, Cr, Mo, W, Mn, Fe, Cu, Al, Si, P, and B, and this element helps achieve a good balance among the discharge capacity, the high-rate discharge characteristic, and the cycle life characteristic. To reliably produce this effect, the value e representing the atomic ratio of this element is preferably 0.01 or larger. However, when the value e exceeds 0.15, the discharge capacity decreases; therefore, the upper limit should be 0.15. To produce the aforementioned effect, the value e is more preferably within a range of 0.02 to 0.14.

When the hydrogen storage alloy having the crystal structure of the $AB_3$-type structure represented by the above general formula (1) is used as a negative electrode of an alkaline storage battery, the negative electrode exhibits a moderate cracking property when storing and releasing hydrogen, as well as has good corrosion resistance also in an alkaline solution, thereby allowing the battery to have an excellent high-rate discharge characteristic and a good cycle life characteristic. From the viewpoint of attaching importance to the high-rate discharge characteristic, it is preferable that one or two or more elements selected from V, Nb, Ta, Cr, Mo, W, Mn, Fe, Cu, Al, Si, P, and B be selected as M element. It is more preferable that among these elements, group Va elements (V, Nb, and Ta), Fe, and Cu be selected, and further that group Va elements be selected. Of elements Co and M, either one needs to be contained. Therefore, the relation $0.01 \leq d+e$ needs to be met. It is more preferable that $0.02 \leq d+e$ be met, and it is further preferable that $0.05 \leq d+e$ be met.

Ratio Between Component a and Component B: $2.85 \leq c+d+e \leq 3.15$

A stoichiometric ratio that is a molar ratio of component B to component A of the $AB_3$-type structure, i.e., the value of c+d+e represented by the general formula needs to be within a range of 2.85 or larger and 3.15 or smaller. When the value is smaller than 2.85, subphases other than the $AB_3$-type structure increase, resulting in a decrease in the discharge capacity and deterioration of the cycle characteristic. On the other hand, when the value exceeds 3.15, the high-rate discharge characteristic deteriorates. The value of c+d+e is preferably within a range of 2.90 to 3.10.

Ratio of Elements in Component A: $0.93 \leq (x-y) \cdot (1-a-b) + 4.5(a+b) \leq 1.62$ With component A of the $AB_3$-type structure within a range meeting this formula, the hydrogen storage alloy of the present invention has enhanced durability, excellent crack resistance, and an appropriate equilibrium pressure of storing and releasing hydrogen. While the reason is not yet clear, it is known that Mg has a smaller atomic radius than rare earth elements and, when contained in large amounts, causes distortion in the $AB_3$-type structure. On the other hand, La among rare earth elements has a larger atomic radius than Sm. Therefore, the present inventors consider that reducing the atomic ratio of Sm and increasing the atomic ratio of La in proportion to the amount of Mg added mitigates the distortion in the $AB_3$-type structure caused by Mg that takes the positions of rare earth atoms in the crystal lattice. For example, distortion in the crystal lattice of the $AB_3$-type structure increases both when the atomic ratio of La is excessively increased and the atomic ratio of Sm is excessively reduced, and vice versa, with the atomic ratio of Mg held constant, relatively to the atomic ratios of Mg, La, and Sm at which distortion in the crystal lattice is minimized. On the other hand, distortion in the crystal lattice increases similarly both when the ratio of Mg is excessively reduced and when it is excessively increased with the ratios of La and Sm held constant. The range of $(x-y) \cdot (1-a-b)+4.5(a+b)$ is preferably 0.97 or larger and 1.55 or smaller, and more preferably 1.00 or larger and 1.47 or smaller.

Since Ti, Zr, and Hf that are other elements of component A have, like Mg, smaller atomic radii than rare earth elements, these elements are likely to have the same effect on distortion of a crystal structure as Mg.

[Manufacturing Method of Hydrogen Storage Alloy]

Next, a manufacturing method of the hydrogen storage alloy of the present invention will be described.

For the hydrogen storage alloy of the present invention, metal elements such as rare earth elements (Sm, La, Pr, Nd), magnesium (Mg), T element (Ti etc.), nickel (Ni), cobalt (Co), and M element (Nb, V, etc.) are weighed to a predetermined molar ratio. Then, these raw materials are fed into an alumina crucible installed in a high-frequency induction furnace, dissolved in an atmosphere of an inert gas, such as an argon gas, and cast into a mold to produce hydrogen storage alloy ingots. Alternatively, samples in the form of flakes with a thickness of about 200 to 500 μm may be directly produced using a strip casting method.

Since the hydrogen storage alloy of the present invention contains Mg that has a low melting point and a high vapor pressure as a main component, when the raw materials of all the alloy components are dissolved at once, Mg may evaporate and make it difficult to obtain an alloy with the target chemical composition. Therefore, to manufacture the hydrogen storage alloy of the present invention by the dissolving method, it is preferable that, first, the alloy components other than Mg be dissolved, and that then Mg raw materials such as metal Mg and an Mg alloy be fed into the resulting molten metal. Further, it is desirable that this dissolving process be performed in an atmosphere of an inert gas, such as argon or helium. Specifically, it is preferable that this process be performed in a depressurized atmosphere in which an inert gas containing 80 vol % or more of an argon gas is adjusted to 0.05 to 0.2 MPa.

It is preferable that the alloy dissolved under the above conditions be thereafter cast into a water-cooled mold and solidified into hydrogen storage alloy ingots. Then, the melting point ($T_m$) of each of the obtained hydrogen storage alloy ingots is measured using a differential scanning calorimeter (DSC). This is because it is preferable that the hydrogen storage alloy of the present invention be subjected to heat treatment of holding casted ingots in an atmosphere of either an inert gas, such as argon or helium, or a nitrogen gas, or a mixture of the two, at a temperature not lower than 900° C. nor higher than the melting point ($T_m$) of the alloy, for 3 to 50 hours. This heat treatment can raise the ratio of the main phase having the $AB_3$-type crystal structure in the hydrogen storage alloy to 50 vol % or higher and reduce or eliminate an $AB_2$ phase, an $A_2B_7$ phase, and an $AB_5$ phase that are subphases. That the crystal structure of the main phase of the obtained hydrogen storage alloy is an $AB_3$-type structure can be confirmed by X-ray diffraction measurement using Cu-Kα rays.

If the heat treatment temperature is lower than 900° C., subphases remain due to insufficient diffusion of the elements, which may lead to a decrease in the discharge capacity of the battery or deterioration of the cycle characteristic thereof. On the other hand, if the heat treatment temperature is not lower than the alloy's melting point $T_m$ minus 20° C. (not lower than $T_m$–20° C.), crystal grains of the main phase grow and the Mg component evaporate, which may result in a decrease in the hydrogen storage amount due to particle size reduction and changes in the chemical composition. Therefore, the heat treatment temperature is preferably within a range of 900° C. to ($T_m$–30° C.). Further, the temperature is preferably within a range of 900° C. to ($T_m$–50° C.).

If the holding time of the heat treatment is not longer than three hours, the ratio of the main phase cannot be stably raised to 50 vol % or higher. Further, due to insufficient homogenization of the chemical components of the main phase, expansion and contraction during storage and release of hydrogen occur unevenly, so that greater distortion and defect may occur and adversely affect the cycle characteristic. It is preferable that the holding time of the heat treatment be not shorter than four hours, and more preferably not shorter than five hours from the viewpoint of homogenization of the main phase and improvement of crystallinity. However, when the holding time exceeds 50 hours, a larger amount of Mg evaporates and causes a change in the chemical composition, which may result in formation of an $AB_5$-type subphase. Further, such a long holding time may add to the manufacturing cost and cause dust explosion of evaporated fine Mg powder, and is therefore not preferable.

The heat-treated alloy is pulverized by a dry method or a wet method. In the case of pulverization by the dry method, the alloy is pulverized using, for example, a hammer mill or an ACM pulverizer. On the other hand, in the case of pulverization by the wet method, the alloy is pulverized using a bead mill, an attritor, or the like.

When using the hydrogen storage alloy of the present invention for a battery to be used on board a vehicle, it is preferable that the alloy be pulverized to a particle size within a range of 3 to 20 μm, and more preferably within a range of 5 to 15 μm, as a particle size D50 represented by a passing rate 50% on a basis of mass, from the viewpoint of the balance among the battery characteristics including the output and the cycle life characteristic. Further, as these characteristics deteriorate when the particle size distribution of alloy particles is too wide, it is preferable that the particle size D10 represented by a passing rate 10% on a basis of mass be within a range of 0.5 to 9 μm; that the particle size D90 represented by a passing rate 90% on a basis of mass be within a range of 8 to 50 μm; that D10 be within a range of 1 to 7 μm; and that D90 be within a range of 10 to 40 μm. Wet pulverization can safely produce fine powder and is therefore preferable particularly when producing fine powder. The particle size of the alloy particles can be controlled by adjusting the conditions including the diameter, the amount, and the number of rotations of the media.

Here, as the aforementioned particle size distributions D50, D10, and D90 of the alloy particles, values measured by a laser diffraction-scattering particle size distribution measuring device. As the measuring device, for example, MT3300EXII manufactured by MicrotracBEL Corp. can be used.

The pulverized alloy particles may be thereafter subjected to surface treatment of performing alkali treatment using an alkaline solution, such as KOH or NaOH, or acid treatment using nitric acid, sulfuric acid, or an aqueous hydrochloric acid solution. Performing these surface treatments can improve the cycle characteristic and the discharge characteristic of the battery. In particular, in the case of the acid treatment, it is preferable that hydrochloric acid be used as it allows precipitation of Ni with less damage to the alloy's surface. When pulverizing the alloy by the wet method, the surface treatment can also be performed at the same time.

[Alkaline Storage Battery]

Next, the configuration of a second embodiment of the present invention, an alkaline storage battery using the above-described hydrogen storage alloy, will be described with reference to FIG. 1.

Here, the alkaline storage battery 10 of the present invention is composed at least of the positive electrode 1, the negative electrode 2, the electrolyte layer 3, and the exterior can 4 (battery case) housing them. These components will be specifically described below.

<Positive Electrode>

The positive electrode 1 is usually composed of a positive-electrode active material layer and a positive-electrode collector. The positive-electrode active material layer contains at least a positive-electrode active material. The positive-electrode active material layer may further contain at least one of a conductive assistant and a binder. The positive-electrode active material is not particularly limited and may be any material that functions as a battery when combined with the above-described hydrogen storage alloy (negative electrode material). Examples of the positive-electrode active material include a single metal, an alloy, and hydroxide. The positive-electrode active material is preferably a material containing Ni, and more preferably nickel hydroxide. The conductive assistant is not particularly limited and may be any material that can impart electron conductivity. Examples of the conductive assistant include metal powder, such as Ni powder, oxide, such as cobalt oxide, and a carbon material, such as graphite and carbon nanotube. Examples of the binder include synthetic rubber, such as styrene-butadiene rubber (SBR), cellulose, such as carboxymethyl cellulose (CMC), polyol, such as polyvinyl alcohol (PVA), and fluorine resin, such as polyvinylidene fluoride (PVDF). Examples of the material of the positive-electrode collector include stainless steel, aluminum, nickel, iron, and titanium. Examples of the form of the positive-electrode collector include a foil form, a mesh form, and a porous form, and the positive-electrode collector may have any form.

<Negative Electrode>

The negative electrode 2 is usually composed of a negative-electrode active material layer and a negative-electrode collector. The negative-electrode active material layer needs to contain at least the above-described hydrogen storage alloy as a negative-electrode active material. The negative-electrode active material layer may further contain at least one of a conductive assistant and a binder. The conductive assistant is not particularly limited and may be any material that can impart electron conductivity. Examples of the conductive assistant include metal powder, such as Ni powder, oxide, such as cobalt oxide, and a carbon material, such as graphite and carbon nanotube. Examples of the binder include synthetic rubber, such as styrene-butadiene rubber (SBR), cellulose, such as carboxymethyl cellulose (CMC), polyol, such as polyvinyl alcohol (PVA), and fluorine resin, such as polyvinylidene fluoride (PVDF). Examples of the material of the negative-electrode collector include steel, stainless steel, aluminum, nickel, iron, titanium, and carbon. Examples of the form of the negative-electrode collector include a foil form, a mesh form, and a porous form, and the negative-electrode collector may have any form.

<Electrolyte Layer>

The electrolyte layer 3 is a layer that is formed between the positive electrode and the negative electrode and contains an aqueous electrolytic solution. Here, the aqueous electrolytic solution refers to an electrolytic solution for which water is mainly used as a solvent, and this solvent may include components other than water. The ratio of the water to the entire solvent of the electrolytic solution may be 50 mol % or higher, 70 mol % or higher, 90 mol % or higher, or 100 mol %.

It is preferable that the aqueous electrolytic solution be an alkaline solution. Examples of the solute of the alkaline solution include potassium hydroxide (KOH) and sodium hydroxide (NaOH). A higher concentration of the solute in the aqueous electrolytic solution is preferable; for example, the concentration may be 3 mol/L or higher and is preferably 5 mol/L or higher. It is preferable that the electrolyte layer 3 have a separator.

Providing a separator can effectively prevent short circuit. Examples of the separator include a sulfonated non-woven fabric or porous membrane containing a resin, such as polyethylene or polypropylene.

<Exterior Can>

The exterior can 4 is a battery case (cell case) housing the positive electrode 1, the negative electrode 2, and the electrolyte layer 3 described above. The material of the exterior can 4 may be any material that allows the exterior can 4 to remain stable without being corroded by the electrolytic solution and hold a gas (oxygen or hydrogen) that is temporarily produced during charge and the electrolytic solution so as not to leak to the outside. For example, a metal case and a resin case are commonly used.

<Battery>

The battery 10 of the present invention is usually a secondary battery. Thus, the battery 10 can be repeatedly charged and discharged and is therefore suitable, for example, as an on-board battery. In that case, the battery 10 is not limited to being used as a battery for a hybrid electric vehicle in which the battery supplies electricity to a vehicle driving motor, but may also be used in an automobile having a start-stop function to supply electricity to a starter motor that restarts an engine. The term "secondary battery" covers a secondary battery that is used like a primary battery (used to discharge only once after charge). Examples of the form of the battery include a coin form, a laminate form, a cylindrical form, and a rectangular form, and the battery 10 may have any form.

EXAMPLES

Example 1

Cells for evaluation in which hydrogen storage alloys No. 1 to 90 having the element compositions shown in Table 1 below are used as the negative-electrode active material are produced by the procedure to be described below, and experiments for evaluating their characteristics are conducted. Alloys No. 1 to 70 shown in Table 1 are alloy examples that comply with the conditions of the present invention (examples of the invention), and No. 71 to 90 are alloy examples that do not meet the conditions of the present invention (comparative examples). Alloy No. 71 that is a comparative example is used as a reference alloy for evaluating cell characteristics.

(Production of Negative-Electrode Active Material)

The raw materials (Sm, La, Pr, Nd, Mg, Ti, Zr, Hf, Ni, Co, V, Nb, Ta, Cr, Mo, W, Mn, Fe, Cu, Al, Si, P, and B, each with a purity of 99% or higher) of alloys No. 1 to 90 shown in Table 1 are dissolved using a high-frequency induction heating furnace in an argon atmosphere (Ar: 100 vol %, 0.1 MPa) and cast to produce ingots. Then, these alloy ingots are subjected to heat treatment of holding them in an argon atmosphere (Ar: 90 vol %, 0.1 MPa) at the temperatures of the respective alloys' melting points $T_m$ minus 50° C. (940 to 1130° C.) for ten hours. Thereafter, these alloy ingots are roughly pulverized, and then finely pulverized to 13 μm as a D50 on a basis of mass by a wet bead mill to obtain samples (negative-electrode active materials) for cell evaluation. No. 71 $AB_5$ alloy that serves as a reference for alloy cell evaluation is wet-pulverized into fine powder with a size of 25 μm as a D50 on a basis of mass to obtain a sample (negative-electrode active material) for cell evaluation. After the heat treatment, X-ray diffraction measurement is performed on the pulverized powder, and it is confirmed that the main phase of each of alloys No. 1 to 70 that are examples of the invention of the present invention is an $AB_3$ phase.

(Production of Cells for Evaluation)

<Negative Electrode>

The negative-electrode active material prepared as described above, Ni powder as a conductive assistant, and two binders (styrene-butadiene rubber (SBR) and carboxymethyl cellulose (CMC)) are mixed to a ratio by weight of negative-electrode active material:Ni powder:SBR: CMC=95.5:3.0:1.0:0.5 and kneaded into a pasty composition. This pasty composition is applied to perforated metal, dried at 80° C., and then roll-pressed under a load of 15 kN to obtain a negative electrode.

<Positive Electrode>

Nickel hydroxide ($Ni(OH)_2$), metallic cobalt (Co) as a conductive assistant, and two binders (styrene-butadiene rubber (SBR) and carboxymethyl cellulose (CMC)) are mixed to a ratio by weight of $Ni(OH)_2$:Co:SBR:CMC=95.5: 2.0:2.0:0.5 and kneaded into a pasty composition. This pasty composition is applied to porous nickel, dried at 80° C., and then roll-pressed under a load of 15 kN to obtain a positive electrode.

<Electrolytic Solution>

As the electrolytic solution, an alkaline solution obtained by mixing potassium hydroxide (KOH) into pure water to a concentration of 6 mol/L is used.

<Cells for Evaluation>

The above-described positive electrode and negative electrode are disposed inside an acrylic exterior can as a counter electrode and a working electrode, respectively, and the above-described electrolytic solution is poured into the exterior can to produce a cell having an Hg/HgO electrode as a reference electrode, which is then used for an evaluation test. Here, the capacity ratio between the working electrode and the counter electrode is adjusted to working electrode: counter electrode=1:3.

(Evaluation of Cell Characteristics)

The evaluation test of cells for evaluation based on alloys No. 1 to 90 obtained as described above is performed by the following procedure. In this test, all the cells are evaluated at 25° C.

(1) Discharge Capacity of Electrode

The electrode discharge capacity of the working electrode is checked by the following process: Constant-current charge is performed at a current value of 80 mA/g per active material of the working electrode for ten hours, and then constant-current discharge is performed at a current value of 40 mA/g per active material of the working electrode. The discharge is ended on the condition that the potential of the working electrode became −0.5 V. This charge-discharge process is repeated ten times, and the maximum value of the discharge capacity is used as the electrode discharge capacity of the working electrode being tested. It is confirmed that when the cell is charged and discharged ten times, the discharge capacity of the working electrode became saturated and stable.

Using the discharge capacity of $AB_5$ alloy No. 71 shown in Table 1 as a reference capacity, the ratio of the measured discharge capacity to this reference capacity is calculated by the following formula (2). When the calculated ratio is higher than one, the alloy is evaluated as having a larger discharge capacity than the $AB_5$ alloy and therefore excellent.

$$\text{Discharge capacity} = (\text{discharge capacity of alloy being evaluated})/(\text{discharge capacity of } AB_5 \text{ alloy (No. 71)}) \quad (2)$$

(2) Cycle Life Characteristic

Using the cells for each of which the electrode discharge capacity of the working electrode is confirmed in (1) Discharge Capacity of Electrode, the cycle life characteristic of each working electrode is determined by the following process:

A current value required to complete charge or discharge of the electrode discharge capacity of the working electrode confirmed in (1) Discharge Capacity of Electrode in one hour is assumed to be 1 C. A process of performing constant-current charge and constant-current discharge at a current value of C/2 with the state of charge of the working electrode within a range of 20 to 80% is counted as one cycle. A hundred cycles of this process are performed and the discharge capacity after the 100 cycles is measured, and then a capacity maintenance rate is determined by the following formula (3):

$$\text{Capacity maintenance rate} = (\text{discharge capacity at the 100th cycle})/(\text{discharge capacity at the first cycle}) \quad (3)$$

To evaluate the cycle life characteristic, the capacity maintenance rate after 100 cycles of $AB_5$ alloy No. 71 shown in Table 1 is used as a reference capacity maintenance rate, and a ratio to this reference capacity maintenance rate is calculated by the following formula (4). When this ratio is higher than one, the alloy is evaluated as having higher cycle life characteristic than the $AB_5$ alloy and therefore excellent.

Cycle life characteristic=(capacity maintenance rate after 100 cycles of alloy being measured)/(capacity maintenance rate after 100 cycles of $AB_5$ alloy (No. 71)) (4)

(3) High-Rate Discharge Characteristic

Using the cells for each of which the electrode discharge capacity of the working electrode is confirmed in (1) Discharge Capacity of Electrode, the high-rate discharge characteristic of each working electrode is determined by the following process:

A current value required to complete charge or discharge of the electrode discharge capacity of the working electrode confirmed in (1) Discharge Capacity of Electrode in one hour is assumed to be 1 C. First, constant-current charge is performed at C/5 for 7.5 hours, and then constant-current discharge is performed at C/5 until the potential of the working electrode became −0.5 V, and the discharge capacity at this point is used as a "C/5 discharge capacity." Next, constant-current charge is performed at C/5 for 7.5 hours, and then constant-current discharge is performed at 1° C. until the potential of the working electrode became −0.5 V, and the discharge capacity at this point is used as a "10 C discharge capacity." As shown in the following formula (5), the ratio of the 10 C discharge capacity to the C/5 discharge capacity is determined as the capacity maintenance rate.

Capacity maintenance rate for 10 C discharge=(10 C discharge capacity)/(C/5 discharge capacity) (5)

To evaluate the high-rate discharge characteristic, the capacity maintenance rate for 10 C discharge of $AB_5$ alloy No. 71 shown in Table 1 is used as a reference capacity maintenance rate, and a ratio to this reference capacity maintenance rate is calculated by the following formula (6). When this ratio is higher than one, the alloy is evaluated as being superior in high-rate discharge characteristic to the $AB_5$ alloy.

High-rate discharge characteristic=(capacity maintenance rate for 10 C discharge of alloy being measured)/(capacity maintenance rate for 10 C discharge of $AB_5$ alloy (No. 71)) (6)

TABLE 1

| Alloy No. | Element composition of hydrogen storage alloy | Discharge capacity (relative to alloy No. 71) | Cycle life characteristic (relative to alloy No. 71) | High-rate discharge characteristic (relative to alloy No. 71) | Remarks |
|---|---|---|---|---|---|
| 1 | $(La_{0.95}Sm_{0.05})_{0.55}Mg_{0.45}Ni_{2.80}Co_{0.20}$ | 1.21 | 1.12 | 1.25 | Invention Example |
| 2 | $(La_{0.95}Sm_{0.05})_{0.60}Mg_{0.40}Ni_{2.80}Co_{0.20}$ | 1.21 | 1.16 | 1.25 | Invention Example |
| 3 | $(La_{0.90}Sm_{0.10})_{0.65}Mg_{0.35}Ni_{2.75}Co_{0.25}$ | 1.26 | 1.21 | 1.25 | Invention Example |
| 4 | $(La_{0.80}Sm_{0.20})_{0.67}Mg_{0.33}Ni_{2.75}Co_{0.25}$ | 1.26 | 1.24 | 1.33 | Invention Example |
| 5 | $(La_{0.70}Sm_{0.30})_{0.72}Mg_{0.28}Ni_{2.70}Co_{0.30}$ | 1.28 | 1.28 | 1.29 | Invention Example |
| 6 | $(La_{0.60}Sm_{0.40})_{0.74}Mg_{0.26}Ni_{2.70}Co_{0.30}$ | 1.26 | 1.29 | 1.28 | Invention Example |
| 7 | $(La_{0.50}Sm_{0.50})_{0.76}Mg_{0.24}Ni_{2.60}Co_{0.40}$ | 1.30 | 1.30 | 1.20 | Invention Example |
| 8 | $(La_{0.40}Sm_{0.60})_{0.78}Mg_{0.22}Ni_{2.60}Co_{0.40}$ | 1.28 | 1.30 | 1.19 | Invention Example |
| 9 | $(La_{0.30}Sm_{0.70})_{0.80}Mg_{0.20}Ni_{2.50}Co_{0.50}$ | 1.25 | 1.30 | 1.16 | Invention Example |
| 10 | $(La_{0.20}Sm_{0.80})_{0.82}Mg_{0.18}Ni_{2.40}Co_{0.60}$ | 1.23 | 1.28 | 1.16 | Invention Example |
| 11 | $(La_{0.20}Sm_{0.80})_{0.83}Mg_{0.17}Ni_{2.30}Co_{0.70}$ | 1.17 | 1.28 | 1.13 | Invention Example |
| 12 | $(La_{0.75}Sm_{0.20}Pr_{0.05})_{0.70}Mg_{0.30}Ni_{2.70}Co_{0.30}$ | 1.28 | 1.28 | 1.28 | Invention Example |
| 13 | $(La_{0.70}Sm_{0.20}Pr_{0.10})_{0.70}Mg_{0.30}Ni_{2.70}Co_{0.30}$ | 1.28 | 1.30 | 1.26 | Invention Example |
| 14 | $(La_{0.75}Sm_{0.20}Nd_{0.05})_{0.70}Mg_{0.30}Ni_{2.70}Co_{0.30}$ | 1.28 | 1.29 | 1.27 | Invention Example |
| 15 | $(La_{0.80}Sm_{0.20})_{0.70}Mg_{0.28}Zr_{0.02}Ni_{2.60}Co_{0.40}$ | 1.26 | 1.28 | 1.22 | Invention Example |
| 16 | $(La_{0.80}Sm_{0.20})_{0.70}Mg_{0.26}Zr_{0.04}Ni_{2.60}Co_{0.40}$ | 1.24 | 1.26 | 1.21 | Invention Example |
| 17 | $(La_{0.80}Sm_{0.20})_{0.70}Mg_{0.25}Zr_{0.05}Ni_{2.60}Co_{0.40}$ | 1.25 | 1.25 | 1.17 | Invention Example |
| 18 | $(La_{0.80}Sm_{0.20})_{0.70}Mg_{0.28}Ti_{0.02}Ni_{2.60}Co_{0.40}$ | 1.25 | 1.25 | 1.23 | Invention Example |
| 19 | $(La_{0.80}Sm_{0.20})_{0.70}Mg_{0.28}Hf_{0.02}Ni_{2.60}Co_{0.40}$ | 1.26 | 1.25 | 1.24 | Invention Example |
| 20 | $(La_{0.70}Sm_{0.30})_{0.72}Mg_{0.28}Ni_{2.60}Co_{0.20}$ | 1.10 | 1.06 | 1.14 | Invention Example |
| 21 | $(La_{0.70}Sm_{0.30})_{0.72}Mg_{0.28}Ni_{2.65}Co_{0.20}$ | 1.13 | 1.12 | 1.17 | Invention Example |
| 22 | $(La_{0.70}Sm_{0.30})_{0.72}Mg_{0.28}Ni_{2.70}Co_{0.20}$ | 1.23 | 1.18 | 1.27 | Invention Example |
| 23 | $(La_{0.70}Sm_{0.30})_{0.72}Mg_{0.28}Ni_{2.75}Co_{0.25}$ | 1.27 | 1.25 | 1.27 | Invention Example |
| 24 | $(La_{0.70}Sm_{0.30})_{0.72}Mg_{0.28}Ni_{2.75}Co_{0.30}$ | 1.28 | 1.24 | 1.25 | Invention Example |
| 25 | $(La_{0.70}Sm_{0.30})_{0.72}Mg_{0.28}Ni_{2.75}Co_{0.35}$ | 1.28 | 1.19 | 1.22 | Invention Example |
| 26 | $(La_{0.70}Sm_{0.30})_{0.72}Mg_{0.28}Ni_{2.75}Co_{0.40}$ | 1.27 | 1.16 | 1.18 | Invention Example |
| 27 | $(La_{0.70}Sm_{0.30})_{0.72}Mg_{0.28}Ni_{2.75}Co_{0.45}$ | 1.24 | 1.08 | 1.15 | Invention Example |
| 28 | $(La_{0.60}Sm_{0.40})_{0.74}Mg_{0.26}Ni_{2.70}Co_{0.25}Al_{0.05}$ | 1.23 | 1.29 | 1.28 | Invention Example |
| 29 | $(La_{0.60}Sm_{0.40})_{0.74}Mg_{0.26}Ni_{2.70}Co_{0.25}Al_{0.10}$ | 1.18 | 1.30 | 1.25 | Invention Example |
| 30 | $(La_{0.60}Sm_{0.40})_{0.74}Mg_{0.26}Ni_{2.70}Co_{0.25}V_{0.05}$ | 1.24 | 1.29 | 1.28 | Invention Example |
| 31 | $(La_{0.60}Sm_{0.40})_{0.74}Mg_{0.26}Ni_{2.70}Co_{0.25}V_{0.10}$ | 1.17 | 1.31 | 1.32 | Invention Example |
| 32 | $(La_{0.60}Sm_{0.40})_{0.74}Mg_{0.26}Ni_{2.70}Co_{0.25}Nb_{0.05}$ | 1.24 | 1.32 | 1.28 | Invention Example |
| 33 | $(La_{0.60}Sm_{0.40})_{0.74}Mg_{0.26}Ni_{2.70}Co_{0.25}Nb_{0.10}$ | 1.18 | 1.29 | 1.33 | Invention Example |

TABLE 1-continued

| Alloy No. | Element composition of hydrogen storage alloy | Discharge capacity (relative to alloy No. 71) | Cycle life characteristic (relative to alloy No. 71) | High-rate discharge characteristic (relative to alloy No. 71) | Remarks |
|---|---|---|---|---|---|
| 34 | $(La_{0.60}Sm_{0.40})_{0.74}Mg_{0.26}Ni_{2.70}Co_{0.25}Ta_{0.05}$ | 1.24 | 1.31 | 1.26 | Invention Example |
| 35 | $(La_{0.60}Sm_{0.40})_{0.74}Mg_{0.26}Ni_{2.70}Co_{0.25}Ta_{0.10}$ | 1.19 | 1.30 | 1.31 | Invention Example |
| 36 | $(La_{0.60}Sm_{0.40})_{0.74}Mg_{0.26}Ni_{2.70}Co_{0.25}Fe_{0.05}$ | 1.25 | 1.32 | 1.24 | Invention Example |
| 37 | $(La_{0.60}Sm_{0.40})_{0.74}Mg_{0.26}Ni_{2.70}Co_{0.25}Fe_{0.10}$ | 1.20 | 1.29 | 1.29 | Invention Example |
| 38 | $(La_{0.60}Sm_{0.40})_{0.74}Mg_{0.26}Ni_{2.70}Co_{0.25}Cu_{0.05}$ | 1.25 | 1.30 | 1.27 | Invention Example |
| 39 | $(La_{0.60}Sm_{0.40})_{0.74}Mg_{0.26}Ni_{2.70}Co_{0.20}Cu_{0.10}$ | 1.20 | 1.30 | 1.31 | Invention Example |
| 40 | $(La_{0.60}Sm_{0.40})_{0.74}Mg_{0.26}Ni_{2.70}Co_{0.25}Cr_{0.05}$ | 1.24 | 1.32 | 1.23 | Invention Example |
| 41 | $(La_{0.50}Sm_{0.50})_{0.75}Mg_{0.25}Ni_{2.70}Co_{0.20}Cr_{0.10}$ | 1.18 | 1.31 | 1.22 | Invention Example |
| 42 | $(La_{0.50}Sm_{0.50})_{0.75}Mg_{0.25}Ni_{2.70}Co_{0.25}Mo_{0.05}$ | 1.23 | 1.30 | 1.26 | Invention Example |
| 43 | $(La_{0.50}Sm_{0.50})_{0.75}Mg_{0.25}Ni_{2.70}Co_{0.25}W_{0.05}$ | 1.24 | 1.29 | 1.27 | Invention Example |
| 44 | $(La_{0.50}Sm_{0.50})_{0.75}Mg_{0.25}Ni_{2.70}Co_{0.25}Mn_{0.05}$ | 1.23 | 1.30 | 1.26 | Invention Example |
| 45 | $(La_{0.50}Sm_{0.50})_{0.75}Mg_{0.25}Ni_{2.70}Co_{0.25}Mn_{0.10}$ | 1.20 | 1.31 | 1.21 | Invention Example |
| 46 | $(La_{0.50}Sm_{0.50})_{0.75}Mg_{0.25}Ni_{2.70}Co_{0.25}Si_{0.05}$ | 1.21 | 1.31 | 1.20 | Invention Example |
| 47 | $(La_{0.50}Sm_{0.50})_{0.75}Mg_{0.25}Ni_{2.70}Co_{0.25}P_{0.05}$ | 1.22 | 1.31 | 1.22 | Invention Example |
| 48 | $(La_{0.50}Sm_{0.50})_{0.75}Mg_{0.25}Ni_{2.70}Co_{0.25}B_{0.05}$ | 1.21 | 1.30 | 1.21 | Invention Example |
| 49 | $(La_{0.05}Sm_{0.95})_{0.82}Mg_{0.18}Ni_{2.90}Mn_{0.10}$ | 1.14 | 1.35 | 1.28 | Invention Example |
| 50 | $(La_{0.10}Sm_{0.90})_{0.80}Mg_{0.20}Ni_{2.90}Mn_{0.10}$ | 1.16 | 1.33 | 1.31 | Invention Example |
| 51 | $(La_{0.20}Sm_{0.80})_{0.72}Mg_{0.24}Ni_{2.90}Mn_{0.10}$ | 1.17 | 1.30 | 1.35 | Invention Example |
| 52 | $(La_{0.30}Sm_{0.70})_{0.74}Mg_{0.26}Ni_{2.90}Mn_{0.10}$ | 1.19 | 1.29 | 1.38 | Invention Example |
| 53 | $(La_{0.40}Sm_{0.60})_{0.72}Mg_{0.28}Ni_{2.90}Mn_{0.10}$ | 1.19 | 1.28 | 1.37 | Invention Example |
| 54 | $(La_{0.50}Sm_{0.50})_{0.70}Mg_{0.30}Ni_{2.90}Mn_{0.10}$ | 1.20 | 1.27 | 1.36 | Invention Example |
| 55 | $(La_{0.60}Sm_{0.40})_{0.69}Mg_{0.31}Ni_{2.90}Mn_{0.10}$ | 1.22 | 1.25 | 1.36 | Invention Example |
| 56 | $(La_{0.70}Sm_{0.30})_{0.68}Mg_{0.32}Ni_{2.90}Mn_{0.10}$ | 1.21 | 1.24 | 1.33 | Invention Example |
| 57 | $(La_{0.80}Sm_{0.20})_{0.67}Mg_{0.33}Ni_{2.90}Mn_{0.10}$ | 1.23 | 1.22 | 1.33 | Invention Example |
| 58 | $(La_{0.40}Sm_{0.60})_{0.72}Mg_{0.28}Ni_{2.90}Al_{0.05}Mn_{0.05}$ | 1.10 | 1.32 | 1.35 | Invention Example |
| 59 | $(La_{0.50}Sm_{0.50})_{0.70}Mg_{0.30}Ni_{2.90}Al_{0.05}Mn_{0.05}$ | 1.11 | 1.31 | 1.35 | Invention Example |
| 60 | $(La_{0.60}Sm_{0.40})_{0.69}Mg_{0.31}Ni_{2.90}Al_{0.05}Mn_{0.05}$ | 1.16 | 1.30 | 1.36 | Invention Example |
| 61 | $(La_{0.70}Sm_{0.30})_{0.68}Mg_{0.32}Ni_{2.90}Al_{0.05}Mn_{0.05}$ | 1.18 | 1.29 | 1.35 | Invention Example |
| 62 | $(La_{0.80}Sm_{0.20})_{0.67}Mg_{0.33}Ni_{2.90}Al_{0.05}Mn_{0.05}$ | 1.18 | 1.30 | 1.31 | Invention Example |
| 63 | $(La_{0.30}Sm_{0.70})_{0.74}Mg_{0.26}Ni_{2.90}Al_{0.05}Mn_{0.05}$ | 1.12 | 1.34 | 1.36 | Invention Example |
| 64 | $(La_{0.20}Sm_{0.80})_{0.76}Mg_{0.24}Ni_{2.95}Al_{0.05}$ | 1.11 | 1.36 | 1.35 | Invention Example |
| 65 | $(La_{0.30}Sm_{0.70})_{0.74}Mg_{0.26}Ni_{2.95}Al_{0.05}$ | 1.13 | 1.33 | 1.32 | Invention Example |
| 66 | $(La_{0.40}Sm_{0.60})_{0.72}Mg_{0.28}Ni_{2.95}Al_{0.05}$ | 1.14 | 1.30 | 1.32 | Invention Example |
| 67 | $(La_{0.50}Sm_{0.50})_{0.70}Mg_{0.30}Ni_{2.95}Al_{0.05}$ | 1.16 | 1.29 | 1.33 | Invention Example |
| 68 | $(La_{0.60}Sm_{0.40})_{0.69}Mg_{0.31}Ni_{2.95}Al_{0.05}$ | 1.21 | 1.28 | 1.33 | Invention Example |
| 69 | $(La_{0.70}Sm_{0.30})_{0.68}Mg_{0.32}Ni_{2.95}Al_{0.05}$ | 1.23 | 1.27 | 1.34 | Invention Example |
| 70 | $(La_{0.80}Sm_{0.20})_{0.67}Mg_{0.33}Ni_{2.95}Al_{0.05}$ | 1.23 | 1.28 | 1.35 | Invention Example |
| 71 | $La_{0.90}Ce_{0.10}Ni_{4.20}Co_{0.40}Mn_{0.30}Al_{0.30}$ | 1.00 | 1.00 | 1.00 | Comparative Example (reference) |
| 72 | $La_{0.50}Mg_{0.50}Ni_{2.80}Co_{0.20}$ | 0.82 | 0.85 | 0.92 | Comparative Example |
| 73 | $La_{0.85}Mg_{0.15}Ni_{2.80}Co_{0.10}$ | 0.98 | 1.01 | 1.02 | Comparative Example |
| 74 | $La_{0.80}Mg_{0.20}Ni_{3.00}Co_{0.30}$ | 1.05 | 1.00 | 0.94 | Comparative Example |
| 75 | $La_{0.80}Mg_{0.20}Ni_{2.50}Co_{0.10}$ | 0.85 | 0.87 | 0.90 | Comparative Example |
| 76 | $La_{0.70}Mg_{0.30}Ni_{2.50}Co_{0.50}$ | 1.20 | 0.92 | 0.98 | Comparative Example |
| 77 | $(La_{0.80}Sm_{0.20})_{0.70}Mg_{0.30}Ni_{2.80}Co_{0.20}Al_{0.24}$ | 0.96 | 1.04 | 0.95 | Comparative Example |
| 78 | $(La_{0.80}Sm_{0.20})_{0.67}Mg_{0.25}Zr_{0.08}Ni_{2.60}Co_{0.20}Al_{0.15}$ | 0.93 | 1.03 | 1.01 | Comparative Example |
| 79 | $(La_{0.60}Sm_{0.40})_{0.74}Mg_{0.26}Ni_{2.55}Co_{0.90}Al_{0.10}$ | 1.09 | 1.00 | 0.88 | Comparative Example |
| 80 | $(La_{0.20}Ce_{0.70}Sm_{0.10})_{0.73}Mg_{0.27}Ni_{2.60}Co_{0.30}Al_{0.10}$ | 0.97 | 0.86 | 0.95 | Comparative Example |
| 81 | $La_{0.63}Mg_{0.37}Ni_{2.72}Co_{0.32}Al_{0.16}$ | 1.01 | 1.02 | 1.02 | Comparative Example |
| 82 | $(La_{0.83}Nd_{0.17})_{0.70}Mg_{0.30}Ni_{2.90}Co_{0.10}Cu_{0.05}Mn_{0.03}V_{0.02}$ | 1.03 | 1.02 | 0.95 | Comparative Example |
| 83 | $(La_{0.90}Sm_{0.10})_{0.77}Mg_{0.23}Ni_{2.18}Co_{0.62}Fe_{0.16}Al_{0.16}$ | 0.95 | 1.03 | 1.00 | Comparative Example |
| 84 | $(La_{0.71}Nd_{0.29})_{0.70}Mg_{0.30}Ni_{2.80}Mn_{0.20}$ | 1.04 | 1.03 | 0.91 | Comparative Example |
| 85 | $(La_{0.73}Nd_{0.27})_{0.73}Mg_{0.27}Ni_{2.44}Co_{0.31}Mn_{0.31}$ | 0.97 | 1.02 | 0.94 | Comparative Example |
| 86 | $Sm_{0.83}Mg_{0.17}Ni_{2.73}Al_{0.17}$ | 1.04 | 1.01 | 1.00 | Comparative Example |
| 87 | $Sm_{0.80}Mg_{0.20}Ni_{2.73}Al_{0.15}$ | 1.05 | 0.98 | 1.01 | Comparative Example |
| 88 | $(La_{0.20}Nd_{0.20}Sm_{0.60})_{0.85}Mg_{0.15}Ni_{2.80}Al_{0.20}$ | 1.02 | 1.00 | 0.96 | Comparative Example |
| 89 | $(La_{0.40}Sm_{0.60})_{0.85}Mg_{0.15}Ni_{3.0}$ | 1.07 | 1.00 | 0.97 | Comparative Example |
| 90 | $(La_{0.35}Sm_{0.65})_{0.65}Mg_{0.35}Ni_{2.80}Mn_{0.20}$ | 1.05 | 0.95 | 1.05 | Comparative Example |

As is clear from Table 1, compared with AB₅ alloy No. 71, alloys No. 1 to 70 that are examples of the invention have excellent characteristics, with the evaluation values equal to or higher than 1.10 for each of the discharge capacity, the cycle life characteristic, and the high-rate discharge characteristic. It can be seen that, in contrast, the evaluation values of alloys No. 72 to 90 that are comparative examples are lower than 1.00 for one of the characteristics or lower than 1.05 for all the characteristics.

Figure 2:
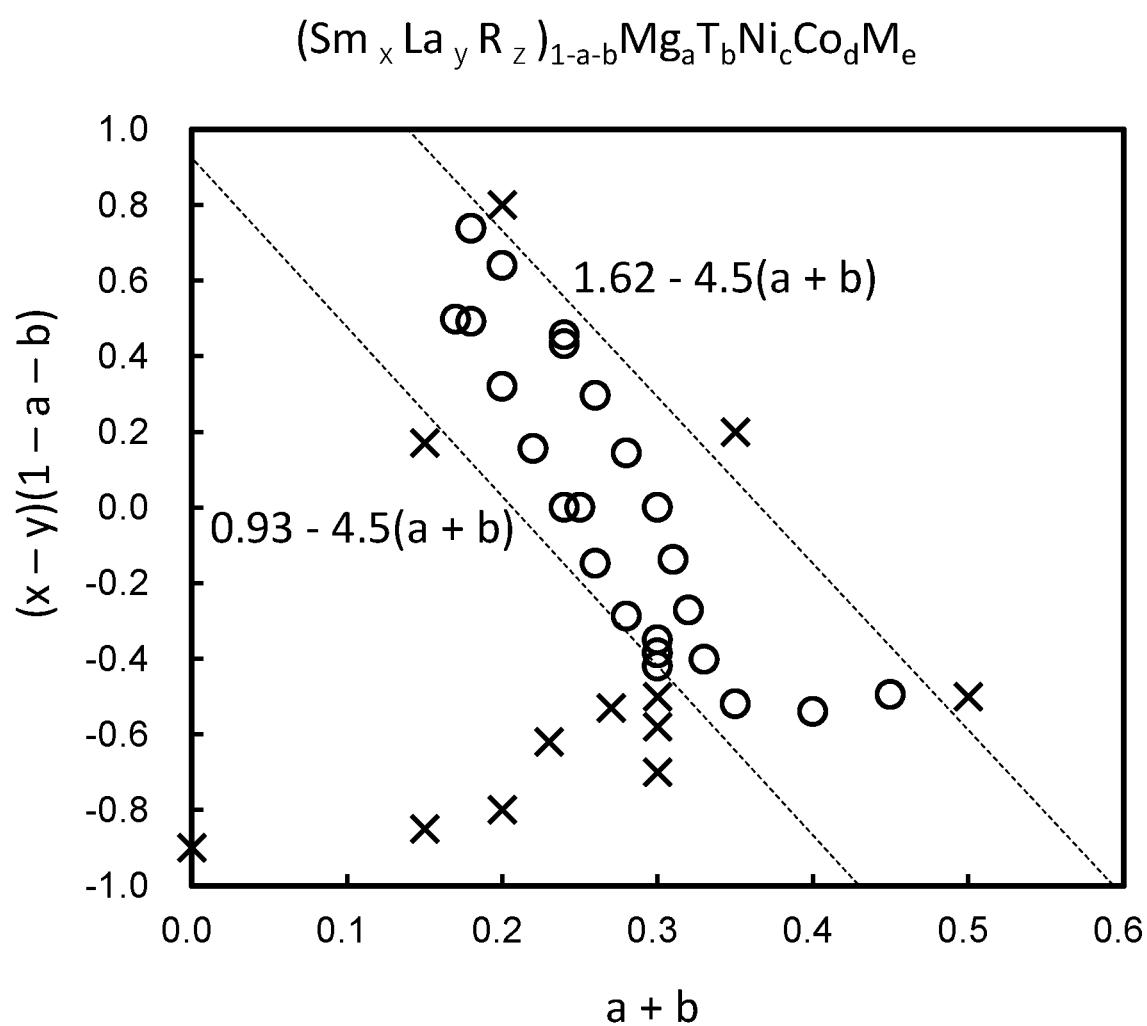
FIG. 2 is a graph showing relationships between the ratios of Sm and La and the amount of Mg etc. added in alloy compositions of the present invention.

Here, FIG. 2 shows a result of extracting those of hydrogen storage alloys No. 1 to 90 shown in Table 1 that meet the conditions of the general formula (1) except for the ratios of Sm and La, and then sorting out influences that the value of a+b in the general formula (1) and the difference between the atomic ratio of Sm and the atomic ratio of La, (x−y)·(1−a−b), in component A of the general formula (1) have on the evaluation values of the cell characteristics shown in Table 1. In FIG. 2, circles represent alloys of the present invention for which the evaluation values of the discharge capacity, the cycle life characteristic, and the high-rate discharge characteristic are 1.10 or higher, and crosses represent alloys of comparative examples that do not meet this condition.

As can be seen from this graph, all the alloys of the present invention fall within a range of 0.93 (x−y)·(1−a−b)+ 4.5 (a+b)≤1.62. This proves that not only does the main phase of the alloy of the present invention need to have an $AB_3$ crystal structure, but also x, y, a, and b in the general formula (1) need to meet this relation.

Example 2

(Production of Negative-Electrode Active Material)

A hydrogen storage alloy having an element composition of $(La_{0.75}Sm_{0.25})_{0.70}Mg_{0.30}Ni_{2.90}Mn_{0.10}$ is dissolved using a high-frequency induction heating furnace in an argon atmosphere (Ar: 90 vol %, 0.15 MPa) and cast to obtain an ingot. Then, this ingot is subjected to heat treatment of holding it in an argon atmosphere (Ar: 100 vol %, 0.5 MPa) at 960° C. (the alloy's melting point $T_m$ minus 50° C.) for ten hours. Thereafter, this ingot is roughly pulverized, and then finely pulverized to the particle sizes shown in Table 2 to obtain samples (negative-electrode active materials) for cell evaluation. Samples No. B1 to B5 shown in Table 2 are obtained by finely pulverizing the ingot using a wet bead mill, and samples No. B6 to B9 are obtained by finely pulverizing the ingot using an ACM pulverizer.

As an alloy of a comparative example, an alloy of $MmNi_{4.0}Co_{0.4}Mn_{0.3}Al_{0.3}$ (sample No. BZ) is dissolved, heat-treated, and roughly pulverized in the same manner as described above. Then, this alloy is finely pulverized using a bead mill into fine powder with a size of 10.0 μm as a D50 on a basis of mass to obtain a sample (negative-electrode active material) for cell evaluation. Here, Mm is a mixture of rare earth elements composed 25% of La, 50% of Ce, 5% of Pr, and 20% of Nd, all by mass.

As a result of X-ray diffraction performed on the obtained samples, it is confirmed that the main phases of the alloys of samples No. B1 to B9 had an $AB_3$-type crystal structure, and that the main phase of the alloy of sample No. BZ that is the comparative example had an $AB_5$-type crystal structure.

TABLE 2

| | Particle size distribution (on a basis of mass) | | Electrode characteristics | | | |
|---|---|---|---|---|---|---|
| | | | Discharge capacity | Cycle life characteristic | High-rate discharge characteristic | |
| Sample No. | D50 (μm) | D90 (μm) | (relative to sample BZ) | (relative to sample BZ) | (relative to sample BZ) | Remarks |
| B1 | 2.1 | 6.3 | 1.17 | 1.00 | 1.25 | Invention Example |
| B2 | 3.2 | 8.2 | 1.19 | 1.08 | 1.26 | Invention Example |
| B3 | 5.0 | 9.9 | 1.21 | 1.14 | 1.29 | Invention Example |
| B4 | 10.3 | 21.8 | 1.22 | 1.22 | 1.30 | Invention Example |
| B5 | 13.8 | 29.8 | 1.22 | 1.25 | 1.23 | Invention Example |
| B6 | 15.0 | 32.5 | 1.22 | 1.26 | 1.17 | Invention Example |
| B7 | 17.8 | 38.9 | 1.21 | 1.32 | 1.13 | Invention Example |
| B8 | 20.0 | 43.5 | 1.21 | 1.30 | 1.10 | Invention Example |
| B9 | 22.3 | 49.0 | 1.19 | 1.28 | 1.03 | Invention Example |
| BZ | 10.0 | 21.5 | 1.00 | 1.00 | 1.00 | Comparative example (reference) |

(Production of Evaluation Cells and Evaluation of Cell Characteristics)

Next, using the samples for cell evaluation prepared as described above, evaluation cells are produced in the same manner as in Example 1, and the cell characteristics (the discharge capacity, the cycle life characteristic, and the high-rate discharge characteristic) are evaluated in the same manner as in Example 1. The results are relatively evaluated, as in Example 1, using the measured value of alloy sample No. BZ that is the comparative example as a reference value (1.00). The result is included in Table 2.

As is clear from Table 2, compared with alloy No. BZ that is the comparative example serving as a reference, alloys No. B1 to B9 that comply with the present invention are excellent with the evaluation values 1.08 or higher for all the discharge capacity, the cycle life characteristic, and the high-rate discharge characteristic. It should be noted that alloy No. B1 of which the particle sizes D50 and D90 are smaller than the preferable lower limits of the present invention is excellent in discharge capacity and high-rate discharge characteristic but equivalent in cycle life characteristic to reference alloy BZ. On the other hand, alloy No. B9 of which the particle size D50 exceeds the preferable upper limit of the present invention is excellent in discharge capacity and cycle life characteristic but equivalent in high-rate discharge characteristic to reference alloy BZ.

Example 3

(Production of Negative-Electrode Active Material)

A hydrogen storage alloy having an element composition of $(La_{0.75}Sm_{0.25})_{0.70}Mg_{0.30}Ni_{2.90}Al_{0.05}Mn_{0.05}$ is dissolved using a high-frequency induction heating furnace in an argon atmosphere (Ar: 100 vol %, 0.1 MPa) and cast to obtain an ingot. Then, this ingot is subjected to heat treatment of holding it in an argon atmosphere (Ar: 90 vol %, 0.1 MPa) at 1000° C. (the alloy's melting point $T_m$ minus 50° C.) for ten hours. Thereafter, this ingot is roughly pulverized, and then finely pulverized to 10.2 μm as a D50 on a basis of mass using a wet bead mill.

Then, surface treatment by the following two standards is performed on the finely pulverized alloy powder to obtain samples (negative-electrode active materials) for cell evaluation.

Alkali treatment: immersing the alloy in a 60° C. aqueous sodium hydroxide containing 40 mass % of NaOH, under the condition of a solid to liquid ratio of 1:2, for two hours (sample No. C1)

Acid treatment: immersing the alloy in a 30° C. aqueous hydrochloric acid solution with a concentration of 1 mol/L, under the condition of a solid to liquid ratio of 1:1, for two hours (sample No. C2)

(Production of Evaluation Cells and Evaluation of Cell Characteristics)

Next, using the samples for cell evaluation prepared as described above, evaluation cells are produced in the same manner as in Example 1, and the cell characteristics (the discharge capacity, the cycle life characteristic, and the high-rate discharge characteristics) are evaluated in the same manner as in Example 1. The results are relatively evaluated using, as a reference value (1.00), the measured value of alloy sample No. BZ (not surface-treated) that is used as the comparative example in Example 2. The result is shown in Table 3.

TABLE 3

| Sample No. | Discharge capacity (relative to sample BZ) | Cycle characteristic (relative to sample BZ) | High-rate discharge characteristic (relative to sample BZ) | Remarks |
|---|---|---|---|---|
| C1 | 1.14 | 1.30 | 1.33 | Invention Example |
| C2 | 1.18 | 1.29 | 1.38 | Invention Example |
| BZ | 1.00 | 1.00 | 1.00 | Comparative Example (reference) |

A comparison between Table 3 and Table 2 shows that performing surface treatment on the hydrogen storage alloy of the present invention significantly improves its high-rate discharge characteristic.

INDUSTRIAL APPLICABILITY

The hydrogen storage alloy of the present invention is superior to the conventionally used $AB_5$-type hydrogen storage alloys in terms of all the discharge capacity, the cycle life characteristic, and the high-rate discharge characteristic. Therefore, this alloy is not only suitable as a negative electrode material of an alkaline storage battery for a hybrid electric vehicle or an automobile having a start-stop function, but can also be used for an alkaline storage battery of a pure electric vehicle.

REFERENCE SIGNS LIST

1: Positive electrode
2: Negative electrode
3: Electrolyte layer
4: Exterior can (battery case)
10: Alkaline storage battery

The invention claimed is:

1. A hydrogen storage alloy used for an alkaline storage battery in which an electrode group including a nickel positive electrode, a hydrogen storage alloy negative electrode, and a separator is housed inside an exterior can along with an alkaline electrolytic solution, wherein a main phase of the hydrogen storage alloy has a crystal structure of an $AB_3$-type structure, and the hydrogen storage alloy has an element composition represented by the following general formula (1):

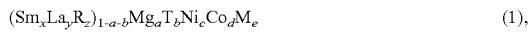

$$(Sm_xLa_yR_z)_{1-a-b}Mg_aT_bNi_cCo_dM_e \quad (1),$$

wherein R, T, and M in the formula (1) are as follows:
R is one or two selected from Pr and Nd, wherein an atomic ratio of each of Pr and Nd in the $Sm_xLa_yR_z$ rare earth elements is up to 0.1;
T is one or two or more selected from Ti, Zr, and Hf; and
M is one or two or more selected from V, Nb, Ta, Cr, Mo, W, Mn, Fe, Cu, Al, Si, P, and B, and
wherein suffixes x, y, z, a, b, c, d, and e meet the following conditions:

$$0<x<1.0, 0<y<1.0, 0.8 \le x+y \le 1.0, x+y+z=1.0;$$

$$0.93 \le (x-y)\cdot(1-a-b)+4.5(a+b) \le 1.62;$$

$$0<a<0.45;$$

$$0 \le b \le 0.05;$$

$$0 \le d \le 0.7;$$

$$0 \le e \le 0.15;$$

$$2.85 \le c+d+e \le 3.15; \text{ and}$$

$$0.01 \le d+e.$$

2. The hydrogen storage alloy for an alkaline storage battery according to claim 1, wherein
the hydrogen storage alloy has a particle size D50 on a basis of mass of 3 to 20 m.

3. The hydrogen storage alloy for an alkaline storage battery according to claim 2, wherein
the hydrogen storage alloy has a particle size D90 on a basis of mass of 8 to 50 μm.

4. The hydrogen storage alloy for an alkaline storage battery according to claim 3, wherein
the hydrogen storage alloy has an alkali-treated layer or an acid-treated layer on a surface.

5. The hydrogen storage alloy for an alkaline storage battery according to claim 2, wherein
the hydrogen storage alloy has an alkali-treated layer or an acid-treated layer on a surface.

6. An alkaline storage battery using the hydrogen storage alloy according to claim 2 as a negative electrode, wherein
the alkaline storage battery is installed in a hybrid electric vehicle having a motor as a driving source and supplies electricity to the motor.

7. An alkaline storage battery using the hydrogen storage alloy according to claim 2 as a negative electrode, wherein
the alkaline storage battery is installed in an automobile that has a start-stop function with an engine started by a starter motor and supplies electricity to the starter motor.

8. The hydrogen storage alloy for an alkaline storage battery according to claim 1, wherein
the hydrogen storage alloy has a particle size D90 on a basis of mass of 8 to 50 m.

9. The hydrogen storage alloy for an alkaline storage battery according to claim 8, wherein
the hydrogen storage alloy has an alkali-treated layer or an acid-treated layer on a surface.

10. An alkaline storage battery using the hydrogen storage alloy according to claim 8 as a negative electrode, wherein
the alkaline storage battery is installed in a hybrid electric vehicle having a motor as a driving source and supplies electricity to the motor.

11. An alkaline storage battery using the hydrogen storage alloy according to claim 8 as a negative electrode, wherein
the alkaline storage battery is installed in an automobile that has a start-stop function with an engine started by a starter motor and supplies electricity to the starter motor.

12. The hydrogen storage alloy for an alkaline storage battery according to claim 1, wherein
the hydrogen storage alloy has an alkali-treated layer or an acid-treated layer on a surface.

13. An alkaline storage battery using the hydrogen storage alloy according to claim 12 as a negative electrode, wherein
the alkaline storage battery is installed in a hybrid electric vehicle having a motor as a driving source and supplies electricity to the motor.

14. An alkaline storage battery using the hydrogen storage alloy according to claim 12 as a negative electrode, wherein
the alkaline storage battery is installed in an automobile that has a start-stop function with an engine started by a starter motor and supplies electricity to the starter motor.

15. An alkaline storage battery using the hydrogen storage alloy according to claim 1 as a negative electrode, wherein
the alkaline storage battery is installed in a hybrid electric vehicle having a motor as a driving source and supplies electricity to the motor.

16. An alkaline storage battery using the hydrogen storage alloy according to claim 1 as a negative electrode, wherein
the alkaline storage battery is installed in an automobile that has a start-stop function with an engine started by a starter motor and supplies electricity to the starter motor.

* * * * *